United States Patent
Nishikawa et al.

(10) Patent No.: US 10,357,942 B2
(45) Date of Patent: Jul. 23, 2019

(54) GRAPHITE-SILICON COMPOSITE AND PRODUCTION METHOD THEREOF

(71) Applicant: Panasonic Intellectual Property Management Co., Ltd., Osaka (JP)

(72) Inventors: Kazuhiro Nishikawa, Osaka (JP); Naomi Nishiki, Kyoto (JP); Hidetoshi Kitaura, Osaka (JP); Atsushi Tanaka, Osaka (JP); Kimiaki Nakaya, Osaka (JP); Henrik Rønnow, Lausanne (CH)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 304 days.

(21) Appl. No.: 15/206,264

(22) Filed: Jul. 9, 2016

(65) Prior Publication Data

US 2017/0015084 A1    Jan. 19, 2017

(30) Foreign Application Priority Data

Jul. 16, 2015 (JP) ................. 2015-141731

(51) Int. Cl.
*B32B 9/04* (2006.01)
*B32B 9/00* (2006.01)
*B32B 37/06* (2006.01)
*B32B 37/10* (2006.01)

(52) U.S. Cl.
CPC ............ *B32B 9/04* (2013.01); *B32B 9/007* (2013.01); *B32B 37/06* (2013.01); *B32B 37/10* (2013.01); *B32B 2309/02* (2013.01); *B32B 2309/12* (2013.01); *B32B 2309/60* (2013.01); *B32B 2313/00* (2013.01); *B32B 2313/04* (2013.01); *B32B 2551/00* (2013.01)

(58) Field of Classification Search
None
See application file for complete search history.

(56) References Cited

U.S. PATENT DOCUMENTS

2014/0335676 A1* 11/2014 Berger ............ H01L 21/02115
438/455

FOREIGN PATENT DOCUMENTS

| JP | 58-006712 B | 2/1983 |
|---|---|---|
| JP | 3505212 B | 3/2004 |
| JP | 4182323 B | 11/2008 |
| JP | 2008-294110 | 12/2008 |

OTHER PUBLICATIONS

NPL Bailey (Structural and Dynamic Investigations of Graphite Based Materials), 2014, p. 1-222.*

* cited by examiner

*Primary Examiner* — Robert T Butcher
(74) *Attorney, Agent, or Firm* — Wenderoth, Lind & Ponack, L.L.P.

(57) ABSTRACT

A graphite-silicon composite, including: graphite; silicon; and an intermediate layer that is located between the graphite and the silicon, wherein the intermediate layer includes oxygen, carbon and silicon. Furthermore, provided is a method for producing a graphite-silicon composite, including: layering graphite and silicon; and heating the layered graphite and silicon while applying pressure to them, wherein, during heating the layered graphite and silicon while applying pressure to them, an oxygen concentration in the atmosphere is adjusted to 0.2 vol %, the applied pressure is adjusted to 24.5 MPa or higher, and the heating temperature is adjusted to 1260° C. or higher.

6 Claims, 3 Drawing Sheets

GRAPHITE-SILICON COMPOSITE AND PRODUCTION METHOD THEREOF

TECHNICAL FIELD

The technical field relates to a graphite-silicon composite, and a production method thereof. In particular, the technical field relates to a graphite-silicon composite for the purpose of radioactive-ray optical elements and heat-countermeasure members, and a production method thereof.

BACKGROUND

In the past, a composite in which a carbon-based substrate and a silicon substrate are joined via an amorphous-silicon or silicon-carbide layer between their joining surfaces has been reported (Japanese Patent No. 4182323, Publication).

In the above structure, the joining surfaces are molten, thereby forming a layer of a compound of silicon and carbon. This method is advantageous in preparing a large-sized composite substrate.

It has been reported that, in cases where black lead is used for a substrate, a SiC layer is formed on the surface of the black-lead substrate in advance and an amorphous silicon layer is formed on the surface of the silicon substrate in advance, and then, the SiC layer and the amorphous silicon layer are joined, thereby preparing a composite thereof.

Moreover, as an example of a composite of a carbon-based substrate and a ceramic substrate, a composite obtained by joining a graphite film and a silicon substrate has been reported (JP-A-2008-294110). This patent literature has reported that the composite was obtained in the following way: after hydroxyl groups are formed on the surface of the graphite film and silanol groups are formed on the surface of the silicon substrate, both of the substrates are heated while pressure is applied on them, to cause silicon-carbide bonds, thereby joining the substrates.

Furthermore, there is a report in which a substrate that is obtained by forming a silicon oxide film through thermal oxidation of a silicon surface, and a graphite film with hydroxyl groups formed on its surface were subjected to a heat treatment while directly being applied with pressure, thereby producing a composite.

In this method, it is also reported that silicon-carbide bonds can easily be caused to join both the substrates.

The composites of graphite films and silicon substrates prepared by these methods are characterized in that the films and the substrates are joined via silicon-carbide bonds. As an example of a rigid composite in which SiC is formed in a joint interface between a carbon material and a ceramic or metal material, the composite disclosed in JP-B-58-6712 can be mentioned. Meanwhile, a composite that is obtained by joining ceramic substrates with a diffusion layer of oxygen, nitrogen or carbon and a metal layer included therein has also been reported (Japanese Patent No. 3505212, Publication).

SUMMARY

However, in the above-mentioned method for forming a composite of a carbon substrate and a silicon substrate, it is required that a polycrystal-silicon or silicon-carbide film, or an amorphous silicon film is preliminarily formed on the substrate by use of a vacuum-based device in the production steps.

Moreover, the method also requires doping depending on the type of substrate used therein. Therefore, there is a disadvantage that the method requires a number of steps and is very costly.

Furthermore, when the resulting composite is used for a radioactive-ray optical element such as an X-ray monochromator, a dopant such as boron causes variations in the X-ray diffraction. Consequently, problems of a decrease in the intensity of the diffraction X rays, an increase of noise, etc. occur.

Additionally, the layer of a compound of silicon and carbon has a larger elastic modulus, compared with silicon or carbon substrates. Accordingly, it is difficult for the joined composite itself to secure sufficient strength against thermal shock. Furthermore, when the composite is used for a device or member of an electronic apparatus, it is required to pay attention to the design.

Accordingly, an object is to provide a graphite-silicon composite that does not cause problems of reductions in X-ray intensities and increases in noise, in the radioactive-ray optical elements, and that secures sufficient strength against thermal shock. Furthermore, another object is to provide a production method thereof.

In order to achieve the above-described objects, a graphite-silicon composite according to an embodiment including graphite, silicon, an intermediate layer that is located between the graphite and the silicon, wherein the intermediate layer includes oxygen, carbon and silicon.

Furthermore, a method for producing a graphite-silicon composite, including: layering graphite and silicon; and heating the layered graphite and silicon while applying pressure to them, wherein, during heating the layered graphite and silicon while applying pressure to them, an oxygen concentration in the atmosphere is adjusted to 0.2 vol %, the applied pressure is adjusted to 24.5 MPa or higher, and the heating temperature is adjusted to 1260° C. or higher.

In the graphite-silicon composite according to the embodiment and method, high crystallinity possessed by the graphite substrate is maintained. Moreover, the graphite-silicon composite has excellent diffraction performance of X rays as radioactive-ray optical elements such as X-ray monochromators. Furthermore, the graphite-silicon composite secures sufficient strength against thermal shock. Additionally, since high heat conductivity possessed by the graphite substrate has also been maintained in the graphite-silicon composite, the graphite-silicon composite can be utilized as a heat-countermeasure member for semiconductor devices and the like.

DESCRIPTION OF EMBODIMENTS

Figure 1:
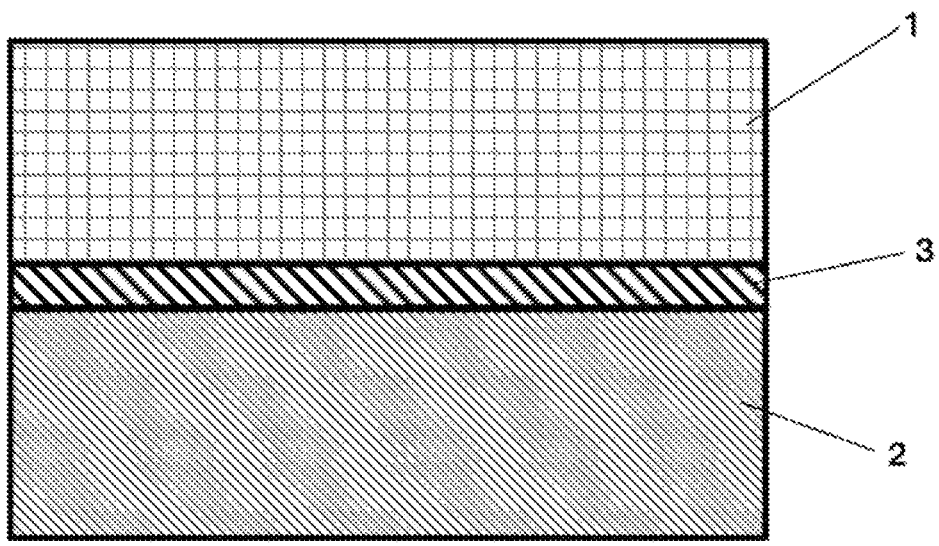
FIG. 1 is a cross-section view of a composite according to an embodiment.

Hereinafter, exemplary embodiments will be described with reference to drawings. A product according to one embodiment is a composite 6 in which graphite, silicon and an intermediate layer are layered. The composite 6 is shown in the cross-section view of FIG. 1.

The composite 6 includes graphite 2, silicon 1, and an intermediate layer 3 therebetween. Due to the presence of oxygen in the intermediate layer 3, the graphite 2 and silicon 1 are reliably joined to one another. Effects of oxygen will be described below.

<Graphite 2>

The graphite 2 is a hexagonal anisotropic material, and has a structure in which planes (ab planes) with six-carbon-membered-rings bound to one another in a net-like fashion are stacked in layers. In the graphite 2 used in the present embodiment, the ab planes are caused to face the silicon 1. However, the graphite is not limited to this configuration, and a plane (c-axis plane) vertical to ab planes may be caused to face the silicon 1. Graphite 2 with high crystallinity is used.

The crystallinity of graphite 2 can be expressed by a half-value width of a peak of a (002) crystal plane based on X-ray diffraction evaluation using a Cu target. As the crystallinity of the graphite 2 comes closer to single crystals, the half-value width becomes smaller.

In order that the composite according to the embodiment may be used for radioactive-ray optical elements, graphite that has very high crystallinity and less defects in its surface and inside is used as the graphite 2. In particular, anisotropic graphite prepared through a heat treatment of a polymer film has very high crystallinity, compared with naturally occurring graphite, a material obtained by processing graphite powders, and a material prepared by deposition of carbon materials based on the CVD method, and therefore, is suitable as graphite used in the invention.

In particular, with regard to crystallinity of the graphite 2, the graphite 2 preferably has a half-value width of 0.20 to 5°.

<Silicon 1>

For the silicon 1, a material that is obtained by slicing silicon ingots prepared based on the CZ method, followed by polishing can be used. Monocrystal silicon is preferable therefor.

<Intermediate Layer 3>

The intermediate layer 3 is a layer that includes silicon, oxygen and carbon. The intermediate layer 3 is a layer that is obtained by joining silicon and carbon using oxygen. The silicon 1 and the graphite 2 are reliably joined by the intermediate layer 3.

Figures 2A, 2B, 2C:
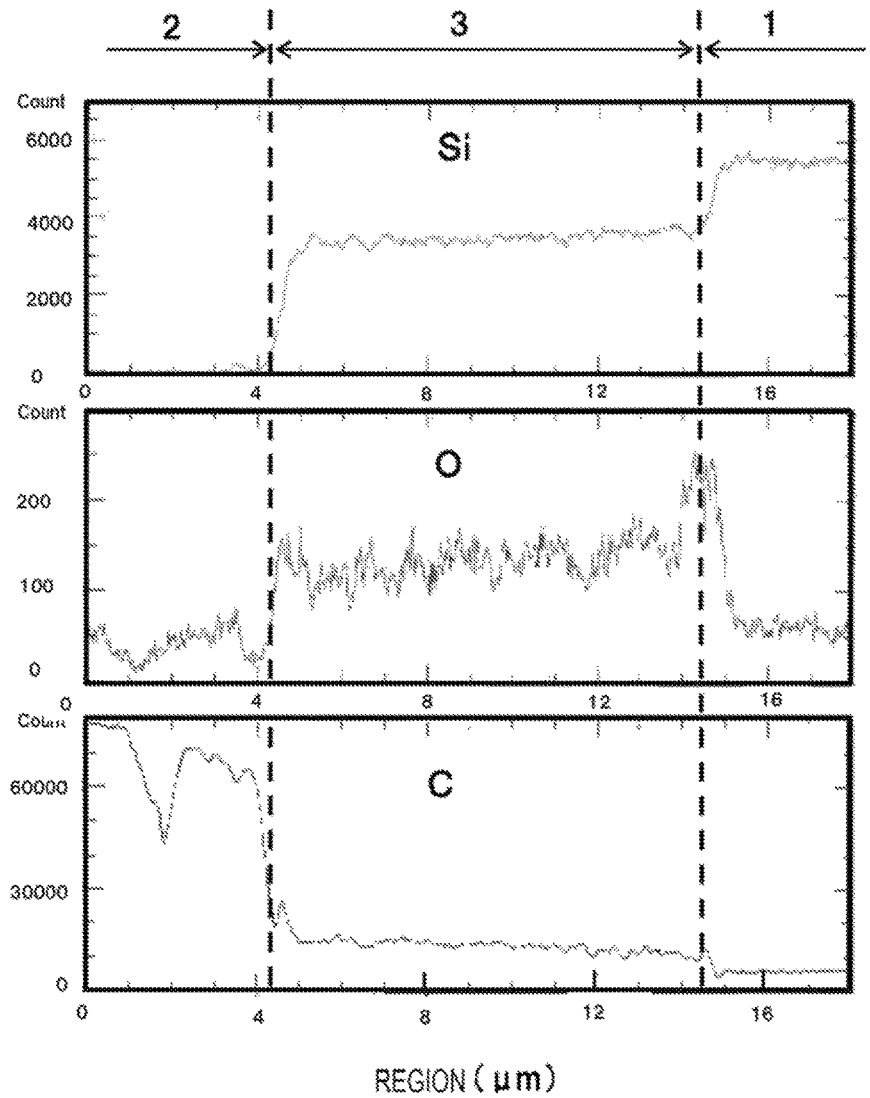
FIG. 2A is a diagram that shows a concentration distribution of Si atoms in a boundary layer in the composite according to an embodiment.
FIG. 2B is a diagram that shows a concentration distribution of oxygen (O) atoms in a boundary layer in the composite according to an embodiment.
FIG. 2C is a diagram that shows a concentration distribution of carbon (C) atoms in a boundary layer in the composite according to an embodiment.

Results of elemental analysis on the silicon 1, the intermediate layer 3 and the graphite 2 including boundary faces therebetween are shown in FIGS. 2A to 2C.

An about-18-micrometer-thick piece that includes the intermediate layer 3 was subjected to a line analysis of silicon atoms, oxygen atoms and carbon atoms by use of FE-EPMA JXA-8530F manufactured by JEOL Ltd. FIGS. 2A, 2B and 2C show results of analysis on silicon, oxygen and elements of the graphite, respectively.

In FIGS. 2A to 2C, the region from 0 μm to 4.3 μm shows the graphite 2, the region from 4.3 μm to 14.5 μm shows the intermediate layer 3 in the boundary face, and the region from 14.5 μm to the end of the horizontal axis shows the layer of the silicon 1. It is required that the intermediate layer 3 has a thickness of 2 μm to 30 μm. The thickness is preferably 4 μm to 15 μm.

As a result, as shown in FIG. 2C, carbon (C) atoms are detected in the region from 0 μm to 4.3 μm. On the other hand, as shown in FIG. 2A, a number of atoms from the silicon 1 are detected in the region from 14.5 μm to the end of the horizontal axis.

Based on these results, it is considered that diffusion of atoms occurs from both of sides of the intermediate layer 3, the sides adjacent to the silicon 1 and the graphite 2, respectively, at different rates, and a trace of oxygen atoms present in the atmosphere are mixed with the diffused atoms there, thereby forming mixed layers.

It may be required that 0.5 atm % to 5 atm % of oxygen atoms are present to the total number of elements.

If the quantity of oxygen atoms is smaller than 0.5 atm %, the junction between the carbon and the silicon based on oxygen may be insufficient, and sufficient joint strength may not be secured.

If the quantity of oxygen atoms is larger than 5% atm, oxygen atoms may bind to carbon and silicon atoms, and they may be formed into oxides.

Elements other than oxygen do not bring about the above-mentioned effects. In the periodic table, there are nitrogen, phosphorus and sulfur, which are elements close to oxygen and silicon. However, an element with the above activity is only oxygen. Elements other than oxygen do not have an ability to bind to carbon and silicon.

With regard to other active elements that are remote from oxygen in the periodic table, the sizes of the atoms are different from that of oxygen, and they bind only to either of oxygen and silicon. Consequently, when such elements are used, silicon and carbon (graphite) cannot be joined to each other.

<Production Method>

Figure 3A:
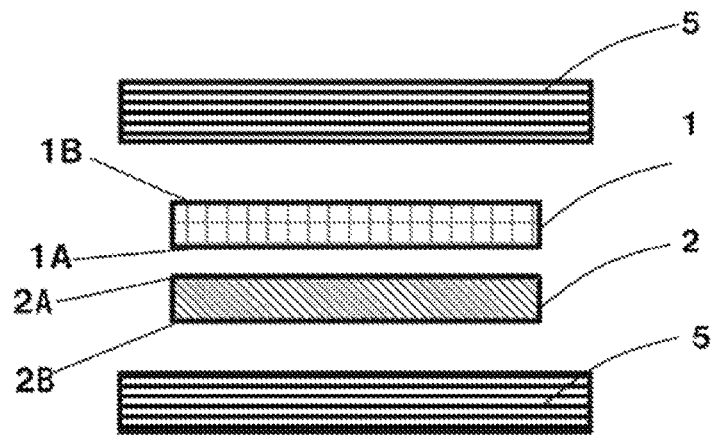
FIGS. 3A-3C are diagrams that show steps for producing a composite according an embodiment.
Figure 3B:
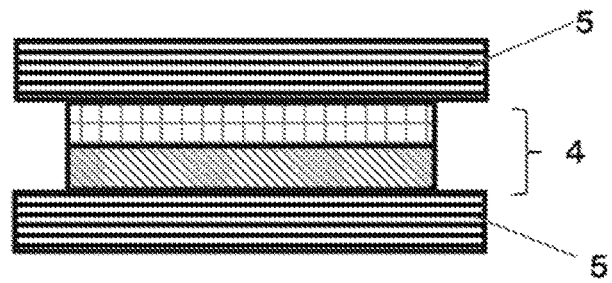
Figure 3C:

FIGS. 3A to 3C are cross-section views that illustrate steps for producing a composite 6 according to an embodiment.

First Step

At first, as shown in FIG. 3A, graphite 2, silicon 1 and a spacer 5 are provided. A joining surface 2A and the opposite surface 2B of the graphite 2 are consistent with ab planes of graphite crystals. On the other hand, a material that is obtained by slicing Si ingots prepared by the CZ method or the like, followed by polishing, is used for the silicon 1.

For the graphite 2, graphite manufactured by PANASONIC CORPORATION (product name: Panasonic Graphite; and commodity number: PGC X-07 and X-10) are provided. The silicon 1 is prepared by slicing silicon ingots prepared through the CZ method, followed by polishing.

PGC X-7 and X-10 have properties in which their half-value widths based on X-ray diffraction in the crystal orientation (002) of the graphite substrates are 0.69 to 0.71 and 1.33 to 1.35, respectively. That is, the numerical values in the commodity numbers refer to the half-value widths.

The roughness (Rz) of the joining surface 2A of the graphite 2 facing the silicon 1 is 3 μm (Rz=3 μm).

Furthermore, the roughness (Rz) of the opposite surface 1B of the silicon 1, the opposite surface 1B facing the graphite 2, is 0.005 μm (Rz=0.005 μm). The graphite 2 and the silicon 1 are placed in such a way that the ab plane of the graphite 2 and the opposite surface 1B of the silicon 1 face each other. There are no limitations to dimensions of the graphite 2 and the silicon 1 used in the embodiment.

The spacer 5 is a material for preventing the composite from adhering to a jig of a hot press device used in the production steps. Alumina or zirconia, highly-crystalline graphite used in the present embodiment, etc. can be used therefor.

As shown in FIG. 3B, the laminate 4 of the silicon 1 and the graphite 2 are treated with a hot press device. The hot press process includes: replacing, with a mixture gas of argon and oxygen mixed at a predetermined ratio, the air inside a chamber of the device in which the laminate 4 is placed; heating the laminate 4 to a predetermined temperature while controlling the pressing pressure to a predetermined value; after the laminate 4 reaches the predetermined temperature, maintaining the laminate 4 at the predetermined temperature for a predetermined amount of time while controlling the pressure; and cooling the laminate 4 while controlling the pressing pressure to a predetermined value.

After the laminate 4 is held for several hours, the pressing pressure is released, and the laminate 4 is cooled at a cooling rate of 5-15° C./minute. Thus, the laminate 4 is formed into a composite 6.

The composite 6 is removed from the chamber after the temperature inside the chamber is cooled approximately to room temperature, and is subjected to evaluations. The intermediate layer 3 (FIG. 1) is formed in the boundary face between the silicon 1 and the graphite 2 in the composite 6.

Example 1

As Example 1, based on the above-described steps, a composite 6 was prepared under the conditions described below.

Graphite manufactured by PANASONIC CORPORATION (product name: Panasonic Graphite; commodity number: PGC X-07) was used as graphite 2. A material obtained by slicing silicon ingots prepared through the CZ method, followed by polishing was provided as silicon 1.

The roughness of the joining surface 2A of the graphite 2 was 3 μm (Rz=3 μm). The roughness of the joining surface 1A of the silicon 1 was 0.005 μm (Rz=0.005 μm). Alumina was used for the spacer 5.

The concentration of oxygen inside the chamber was adjusted to 0.2 vol %, and the total pressure of the chamber was adjusted to 1 atmosphere. Then, the laminate 4 was heated to a predetermined temperature at a temperature-increasing rate of 10° C./minute while being pressed from the direction vertical to the joining surfaces at a pressing pressure of 24.5 MPa. After the temperature of the laminate 4 reached 1260° C., the laminate 4 was maintained at that state for 2 hours. All that time, the pressing pressure was maintained constantly at 24.5 MPa.

After the laminate 4 was maintained in that state for 2 hours, the pressing pressure was reduced to 0 MPa, and the laminate 4 was cooled at a temperature-cooling rate of 10° C./minute. After the temperature inside the chamber was decreased approximately to room temperature, the composite 6 was removed from the chamber, and was subjected to evaluations.

Other conditions are described in Table 1.

Example 2

A composite was produced and subjected to evaluations in the same conditions as those in Example 1 except that the pressing pressure was 44.1 MPa as described in Table 1.

Example 3

A composite was produced and subjected to evaluations in the same conditions as those in Example 1 except that the pressing pressure was 68.6 MPa as described in Table 1.

Example 4

A composite was produced and subjected to evaluations in the same conditions as those in Example 3 except that the heating temperature was 1360° C.

Example 5

A composite was produced and subjected to evaluations in the same conditions as those in Example 3 except that the type of graphite was PGC X-10 (the half-value width: 1.33 to 1.35).

Example 6

A composite was produced and subjected to evaluations in the same conditions as those in Example 3 except that the oxygen concentration was 1.6 vol %.

Example 7

A composite was produced and subjected to evaluations in the same conditions as those in Example 6 except that the pressing pressure in the production conditions was 24.5 MPa. It was deduced that the oxygen concentration in the intermediate layer increased because the pressure was decreased compared with Example 6, and this caused reductions of diffusion rates of graphite and silicon.

Example 8

A composite was produced and subjected to evaluations in the same conditions as those in Example 3 except that the heating temperature in the production conditions was 1400° C. It was deduced that the diffusion rates of graphite and silicon were increased, and the oxygen concentration of the intermediate layer was reduced, when the material was heated to around the melting point of silicon (1414° C.).

In solid-phase diffusion, which occurs in joining of graphite and silicon, the diffusion rates change, and the thicknesses of diffusion layers change, depending on the temperature and the pressure. Furthermore, also with regard to diffusion of gases to solid layers, the diffusion rates change, and the concentrations change, depending on the atmosphere concentration, the pressure, and the temperature.

In these examples, it is considered that the oxygen concentration in the intermediate layer increased when the oxygen concentration was increased, and that, when the pressing pressure was decreased, the diffusion rate of oxygen was not changed, but the oxygen concentration in the intermediate layer was increased because the diffusion rates of graphite and silicon were reduced.

Furthermore, when the heating temperature is elevated to 1400° C., which is around the melting point of silicon, binding of silicon crystals starts to become unstable, binding of graphite proceeds, and the diffusion rate of graphite increases. Therefore, it was deduced that rises in the diffusion rates of graphite and silicon were larger than the rise in the diffusion rate of oxygen due to the increased temperature, and the oxygen concentration was reduced.

Comparative Example 1

A composite was produced and evaluated in the same conditions as those in Example 1 except that the heating temperature was 1150° C.

Comparative Example 2

A composite was produced and evaluated in the same conditions as those in Example 3 except that the heating temperature was 1150° C.

Comparative Example 3

A composite was produced and evaluated in the same conditions as those in Example 3 except that the heating temperature was 1000° C.

Comparative Example 4

A composite was produced and evaluated in the same conditions as those in Example 3 except that the heating temperature was 800° C.

Comparative Example 5

A composite was produced and evaluated in the same conditions as those in Example 3 except that the type of graphite was a prototype (half-value width: 6.0 to 7.0).

Comparative Example 6

A composite was produced and evaluated in the same conditions as those in Example 1 except that the type of graphite was a prototype (half-value width: 6.0 to 7.0).

The above-described conditions and evaluation results described below are shown in Table 1.

obtained by joining the materials (after joining) using an X-ray diffraction device RINT-2200HL/PC manufactured by RIGAKU CORPORATION.

The values refer to minimum and maximum values of half-value widths of crystal peaks of (002) planes when the measurement was conducted at a scanning angle of 11.5° to 14.5°.

When changes in half-value widths before and after joining were within 10%, samples were considered acceptable. This was because, intrinsically, variations of 5% to 10% were observed. Samples exhibiting no changes were considered acceptable.

(Evaluations on Validity of the Joint)

Evaluations on validity of the joint were carried out based on observation on the joining states after composites were produced and removed from the chamber. When a state of disjunction was observed, the sample was considered unacceptable. In other cases, samples were considered acceptable.

(Heat Conductivities)

Heat conductivities were measured with THERMO-WAVE ANALYZER, which was a device manufactured by BETHEL CO., LTD. with respect to opposite surfaces 2B of graphite 2. The heat conductivities were measured before and after the step of joining.

TABLE 1

| | Production conditions | | | | Evaluation | | | | | |
|---|---|---|---|---|---|---|---|---|---|---|
| | Heating temperature (° C.) | Pressing pressure (MPa) | Oxygen concentration (vol %) | Acceptable or unacceptable joint (Superior/Inferior) | Half-value width FWHM (°) Before joining | Half-value width FWHM (°) After joining (Superior/Inferior) | Heat conductivities (W/m · k) Before joining | Heat conductivities (W/m · k) After joining (Superior/Inferior) | Overall judgement (Superior/Inferior) | Oxygen concentration in intermediate layer 3 (atm %) |
| Example 1 | 1260 | 24.5 | 0.2 | Acceptable joint (Superior) | 0.69-0.72 | 0.62-0.78 (Superior) | 1450 | 1400 (Superior) | Superior | 0.7 |
| Example 2 | 1260 | 44.1 | 0.2 | Acceptable joint (Superior) | 0.70-0.72 | 0.62-0.77 (Superior) | 1450 | 1460 (Superior) | Superior | 0.7 |
| Example 3 | 1260 | 68.6 | 0.2 | Acceptable joint (Superior) | 0.70-0.72 | 0.62-0.78 (Superior) | 1450 | 1460 (Superior) | Superior | 0.7 |
| Example 4 | 1360 | 68.6 | 0.2 | Acceptable joint (Superior) | 0.69-0.71 | 0.61-0.78 (Superior) | 1440 | 1400 (Superior) | Superior | 0.7 |
| Example 5 | 1260 | 68.6 | 0.2 | Acceptable joint (Superior) | 1.33-1.35 | 1.18-1.20 (Superior) | 1200 | 1190 (Superior) | Superior | 0.7 |
| Example 6 | 1260 | 68.6 | 1.6 | Acceptable joint (Superior) | 0.69-0.71 | 0.61-0.79 (Superior) | 1430 | 1430 (Superior) | Superior | 4 |
| Example 7 | 1260 | 24.5 | 1.6 | Acceptable joint (Superior) | 0.69-0.72 | 0.61-0.78 (Superior) | 1430 | 1430 (Superior) | Superior | 5 |
| Example 8 | 1400 | 68.6 | 0.2 | Acceptable joint (Superior) | 0.70-0.72 | 0.62-0.77 (Superior) | 1450 | 1450 (Superior) | Superior | 0.5 |
| Comparative Example 1 | 1150 | 24.5 | 0.2 | Unacceptable joint (Inferior) | 0.68-0.72 | 0.62-0.78 (Superior) | 1400 | 1390 (Superior) | Inferior | 0 |
| Comparative Example 2 | 1150 | 68.6 | 0.2 | Unacceptable joint (Inferior) | 0.69-0.71 | 0.60-0.78 (Superior)) | 1460 | 1450 (Superior) | Inferior | 0 |
| Comparative Example 3 | 1000 | 68.6 | 0.2 | Unacceptable joint (Inferior) | 0.67-0.72 | 0.62-0.79 (Superior) | 1450 | 1450 (Superior) | Inferior | 0 |
| Comparative Example 4 | 800 | 68.6 | 0.2 | Unacceptable joint (Interior) | 0.69-0.72 | 0.62-0.78 (Superior) | 1410 | 1420 (Superior) | Inferior | 0 |
| Comparative Example 5 | 1260 | 68.6 | 0.2 | Acceptable joint (Superior) | 6.0-7.0 | 7.0-9.1 (Inferior) | 900 | 880 (Superior) | Inferior | 0 |
| Comparative Example 6 | 1260 | 24.5 | 0.2 | Acceptable joint (Superior) | 6.0-7.0 | 7.0-9.0 (Inferior) | 890 | 890 (Superior) | Inferior | 0 |

<Evaluations>

(Half-Value Width)

Half-value widths shown in Table 1 were values obtained by measuring five points within opposite surfaces 2B of graphite substrates 2 (before joining) and composites 3

When changes in heat conductivities before and after the step of joining were within 5%, the samples were considered acceptable. This was because, intrinsically, variations of 5% were observed. Samples exhibiting no changes in the heat conductivities were considered acceptable.

<Results>
(Heating Temperature)

Based on results of Examples 1 to 5 in Table 1, it was revealed that, when the heating temperature was 1260° C. or higher, it was possible to join the materials within a range of 24.5 MPa to 68.6 MPa, and that no significant changes in the half-value widths were observed, which means that high crystallinity, which graphite 2 had possessed, was maintained.

On the other hand, based on results of Comparative Examples 1 to 4, it was revealed that, when the heating temperature was within a range of 1150° C. to 800° C., it was impossible to join the materials even in cases where the pressing pressure was 68.6 MPa.

(Oxygen)

With regard to Examples 1 to 8 in which samples were considered acceptable in overall judgement, the presence of oxygen atoms in the intermediate layer 3, which was a boundary face, was confirmed. The oxygen concentration is favorably 0.5 atm % to 5 atm %, and more preferably 0.7 atm % to 4 atm %.

(Half-Value Width)

Meanwhile, as shown in Comparative Examples 5 and 6, in cases where composites were prepared in the same conditions as those in Examples 1 and 3, respectively, by use of the series of graphite 2 that had inferior crystallinity having large half-value widths, joining of graphite 2 and silicon 1 was confirmed. However, the half-value widths significantly decreased, and further deteriorations in the crystallinity were observed.

It is considered that this is because inferior crystallinity of the graphite 2 caused intense diffusion of the elements, and this resulted in disturbed boundary faces.

A half-value width of graphite 2 is preferably smaller than at least 6.0°, and is more preferably 1.35° (Example 5) or less.

If the half-value width is 6.0° or larger, disturbance occurs in the regularity of carbon arrangement, and mixing of graphite 2 and silicon 1 may not occur at all.

If the half-value width exceeds 1.35°, the regularity of carbon arrangement may be low, and the mixture of graphite 2 and silicon 1 may be insufficient.

(Heat Conductivities)

As measurement results of Examples 1 to 6 and Comparative Examples 1 to 6 show, there are no significant changes in heat conductivities possessed by graphite 2 before and after any of the production steps shown in these examples.

Furthermore, there are no significant differences in variation ranges in heat conductivities before and after the production steps when Examples 1 to 6 and Comparative Examples 1 to 6 are compared.

(Overall Evaluation)

Only Examples 1 to 6 maintained quality of half-value widths of peaks of (002) planes in X-ray diffraction of graphite 2, and simultaneously maintained heat conductivities.

Variation Examples

Laminate of Multiple Layers

After multiple laminates produced in Examples 1 to 6 in which graphite 2 and silicon 1 are joined to each other are layered, the resulting product can be processed in accordance with the production methods described in Examples 1 to 6, thereby joining multiple composites. The laminates are preferably layered such that joining surfaces 1A of silicon 1 of composites 6, or joining surfaces 1A of silicon 1 and joining surfaces 2A of graphite 2 face each other.

(Covering Layer)

In composites 6 of present embodiments in which graphite and silicon are joined to each other, a metal layer and/or a polymer resin layer may be formed on the opposite surface 2B of graphite 2 and the opposite surface 1B of the silicon 1.

For example, the composite 6 produced in Example 3 can be used to form a polymer resin layer of a polyparaxylylene on the opposite surface 2B of the composite 6, which is the surface of the graphite 2. This makes it possible to achieve electrical insulation on the opposite surface 2B of the graphite 2. Specifically, a polymer resin film of a polyparaxylylene is formed on the opposite surface 2B of the graphite 2 through pyrolytic polymerization using diparaxylylene serving as a material. The thickness of the film of a polyparaxylylene to be formed thereon depends on the amount of time required for film-forming. However, a film thickness of several micrometers to several tens of micrometers makes it possible to achieve the electrical insulation.

Furthermore, for example, it is also possible to form a titanium layer on the opposite surface 2B (which is the surface of the graphite 2) of the composite 6 produced in Example 3. Specifically, there are a film-forming method based on vapor deposition using titanium serving as a material, and a film-forming method based on sputtering using a titanium target, and it is possible to easily form a film on the opposite surface 2B of the graphite 2 by either of methods. This makes it possible to easily adhere the composite to any other metal, in particular, a metal, such as nickel or copper, used in circuit boards or inside semiconductor devices, and therefore, can be introduced as a heat-diffusion layer for semiconductor devices in circuit boards.

(As a Whole)

In addition, the silicon 1 is preferably monocrystal, and the graphite 2 preferably has high purity with less impurities. As a result, for the intermediate layer 3, a material that includes only inevitable elements besides silicon, carbon and oxygen is preferable.

Composites according to present embodiments can be utilized as radioactive-ray monochrometers. Furthermore, the composites can also be applied to heat-release purposes for semiconductor devices and circuit boards.

What is claimed is:

1. A graphite-silicon composite, comprising:
   graphite;
   silicon; and
   an intermediate layer that is located between the graphite and the silicon, wherein the intermediate layer includes oxygen, carbon and silicon,
   wherein the atomic concentration of the oxygen is 0.5 to 5 atm %, and
   wherein the half-value width of an X-ray diffraction peak of a (002) plane of the graphite is smaller than 6°.

2. The graphite-silicon composite according to claim 1, wherein the atomic concentration of the oxygen is 0.7 to 4 atm %.

3. The graphite-silicon composite according to claim 1, wherein the silicon is monocrystal.

4. The graphite-silicon composite according to claim 1, wherein the intermediate layer only includes an inevitable element besides the silicon, the carbon and the oxygen.

5. The graphite-silicon composite according to claim 1, wherein the thickness of the intermediate layer is 2 µm to 30 µm.

6. A method for producing a graphite-silicon composite, comprising:
   layering graphite and silicon; and
   heating the layered graphite and silicon while applying pressure to them, wherein, during heating the layered graphite and silicon while applying pressure to them, an oxygen concentration in the atmosphere is adjusted to 0.2 vol %, the applied pressure is adjusted to 24.5 MPa or higher, and the heating temperature is adjusted to 1260° C. or higher.

* * * * *